(No Model.)
H. K. HESS.
STORAGE BATTERY
No. 525,018. Patented Aug. 28, 1894.
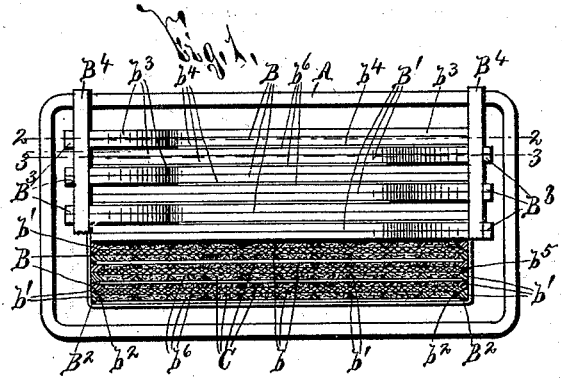
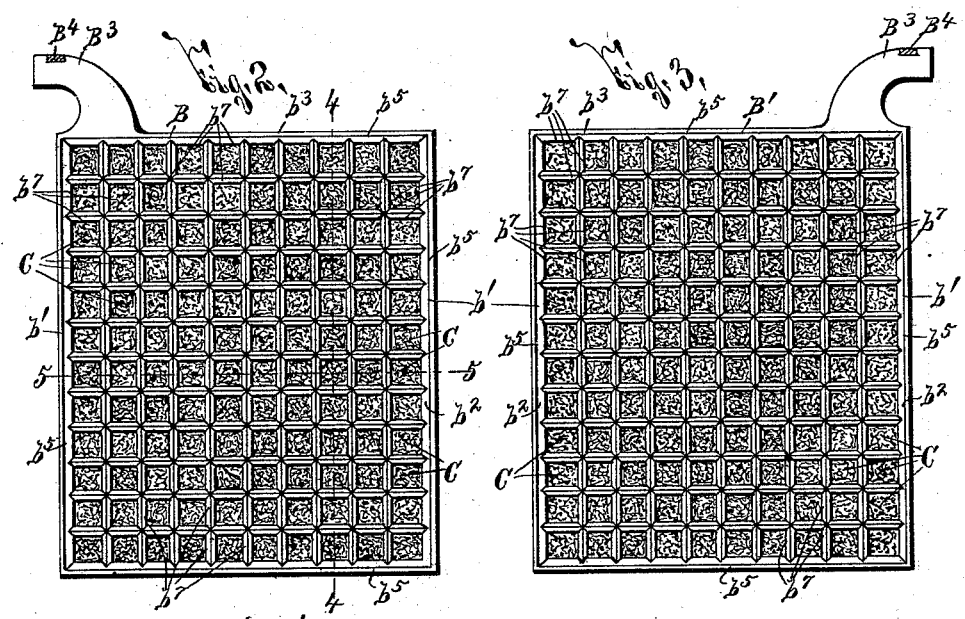
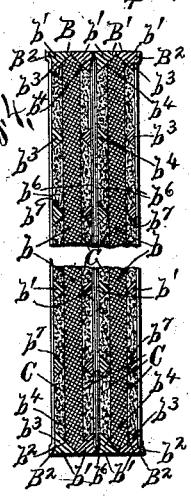
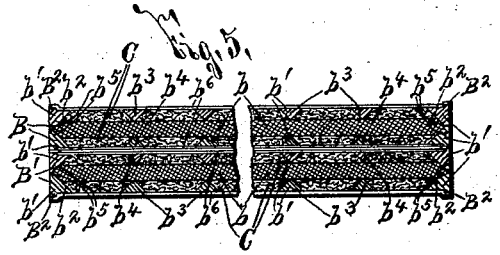
WITNESSES:
INVENTOR
Henry K. Hess
BY
ATTORNEYS

UNITED STATES PATENT OFFICE.

HENRY K. HESS, OF SYRACUSE, NEW YORK.

STORAGE-BATTERY.

SPECIFICATION forming part of Letters Patent No. 525,018, dated August 28, 1894.

Application filed February 13, 1893. Serial No. 462,070. (No model.)

*To all whom it may concern:*

Be it known that I, HENRY K. HESS, of Syracuse, in the county of Onondaga, in the State of New York, have invented new and useful Improvements in Storage-Batteries, of which the following, taken in connection with the accompanying drawings, is a full, clear, and exact description.

My invention relates to improvements in storage batteries, and has for its object the production of a simple, practical, durable, and effective construction, in which the active material is supplied with an abundance of the electrolyte and is firmly and positively held in position without the agency of confining plates or the necessity of mechanically applying the active material to the electric-conductor therefor by pressing the active material into apertures or cut-outs formed in said electric conductor; and to this end it consists, essentially, in an electrolyte-containing cell and electrodes arranged within the cell and insulated one from the other and composed of cores of active material, and electric conductors incasing the active material and having their central portions formed with a series of perforations and their inner surfaces electrically connected to the cores of active material, and non-electric-conducting material arranged within the perforations of the electrodes for supporting the active material and conducting the electrolyte thereto.

The invention furthermore consists in the detail construction and arrangement of the parts, all as hereinafter more particularly described and pointed out in the claims.

In describing this invention, reference is had to the accompanying drawings, forming a part of this specification, in which like letters indicate corresponding parts in all the views.

Figure 1 is a top plan view, partly in section, of my improved battery. Figs. 2 and 3 are vertical sectional views, taken respectively on lines —2—2— and —3—3—, Fig. 1, the electrolyte conducting cell being removed. Fig. 4 is an enlarged vertical sectional view, taken on line —4—4—, Fig. 2, the central portions of the electrodes being broken away. Fig. 5 is an enlarged horizontal sectional view, taken on line —5—5—, Fig. 2, the central portions of the electrodes being broken away.

As stated in my pending application, Serial No. 448,562, it is well known that in storage batteries, as at present constructed, the confining plate or other device for confining the active material in position is more or less liable to become so affected or destroyed by the action of the oxygen evolved during the charging of the battery, the acid in the electrolyte, and by the jarring incidental to the use of the battery on street cars and similar conveyances as to greatly impair its efficiency and to permit the active material to fall downwardly from the electrodes to the base of the battery, and to finally short circuit the same and to conduct the electrolyte with less certainty and positiveness than is required in a practical and efficient battery. Moreover, in storage batteries as usually constructed, the active material is supported in operative position, by means of a comparatively thin electric conductor or grid provided with apertures or cut-outs into which the active material is pressed or forcibly inserted. In the practical use of a battery of this construction the active material expands more or less, and the conductor buckles or bends, and consequently the active material soon escapes from the apertures or cut-outs of the electric conductor, and falls downwardly thus short circuiting the battery as previously stated.

In my present invention I form the electrodes with a central core or body of active material and with an electric conducting body incasing the active material and formed with perforations, and I arrange in the perforations of the electric conducting body, quartz-sand or similar non-electric conducting material. The separate grains of the quartz-sand are held together by a suitable non-electric conducting adhesive material as rubber, shellac, &c., as in my aforesaid application, and it is evident to one skilled in the art that the active material is thereby supplied with an abundance of the electrolyte, and is firmly and positively held in position without the agency of confining plates, or the necessity of mechanically applying the active material to the electric conductor therefor by pressing the active material into apertures or cut-outs formed in said electric conductor. Moreover, as will be apparent upon reference to my specification and the accompanying drawings, my improved battery is economically constructed, and is durable and effective in use, and there is no liability of the active material falling and short circuiting the battery, or of the electric conductor buckling or warping.

—A— represents an outer casing of suitable non-electric conducting material as hard rubber, glass, &c., containing any desirable electrolyte and the positive and negative electrodes —B—B'—. The electrolyte preferably consists of water mixed with a suitable amount of sulphuric acid, and the electrodes —B—B'— are each formed of a central core or body of active material —b— consisting preferably of red lead and litharge and of an incasing electric conducting body —b'— composed preferably of lead and having a central or inner chamber —$b^2$— for receiving the active material.

Upon the contiguous faces of the adjacent electrodes I provide projecting shoulders or lugs —$B^2$— for separating the same. The electrodes —B—B'— are also formed with the usual terminals —$B^3$—, which may be connected either to wires or other electric conductors, or to conducting straps or bars —$B^4$—.

The electrodes —B—B'— are preferably comparatively thin, and the electric conducting body —b'— thereof preferably consists of sections —$b^3$—$b^4$— for facilitating the ready entrance of the active material to its operative position within the chamber —$b^2$—. The body of active material —b— may be economically and easily molded to the required size or shape, and the conducting body —b'— may also be molded or otherwise formed at slight expense.

The electric conducting body —b'— is formed with a series of shoulders —$b^5$— for engaging the edges of the body of active material —b—, and, as clearly shown at Figs. 4 and 5, these shoulders are preferably formed upon the sections —$b^3$— —$b^4$— of said electric conducting body. It is thus evident that the inner faces of the sections —$b^3$—$b^4$— are in electrical contact with the active material —b—, and, as clearly shown at Figs. 4 and 5, the outer sides of said sections are protected from the action of the oxygen by a coating of non-electric conducting material —$b^6$— as hard rubber indestructible by said oxygen and the electrolyte.

The shoulders or lugs —$B^2$—, previously mentioned, are also coated with this non-electric conducting material —$b^6$—, preferably consisting of hard rubber and consequently the electrodes are insulated one from the other. It is evident, however, that they may be insulated in any other well known manner. This is a particularly practical and effective construction of electrode, as it possesses a great amount of conducting surface in contact with the active material, and is protected from disintegration to a maximum degree, since the only surface of the electrode, unprotected by the coating —$b^6$— is in contact with the active material.

The electric conducting body —b'— is formed with a series of perforations —$b^7$— opening outwardly from the chamber —$b^2$— and having their inner ends of greater area than their outer ends. These apertures —$b^7$— are filled with a non-electric conducting material —C— for aiding in the support of the active material and for supplying the electrolyte thereto. This material —C— preferably consists of quartz-sand having its grains held together by a suitable adhesive non-electric conducting material as rubber, shellac, &c., which coats the separate grains of sand without materially filling the interstices between said grains. It is evident that, as the inner ends of the apertures —$b^7$— are of greater capacity than their outer ends, the material —C— is practically and effectively held in position, and it is also evident that any other similar material may be used instead of quartz-sand.

Electrodes of this construction are very readily and cheaply manufactured, and, as previously stated, they possess a great amount of conducting surface, facilitate the ready entrance of the active material to operative position, obviate the use of confining plates and the necessity of the mechanical application of the active material to an electric conducting support by pressing the same into apertures or cut-outs, and facilitate the supply of an abundance of the electrolyte to the active material. Moreover, an electrode of this construction is not at all liable to buckle, and the active material is not liable to fall between the plates and short circuit the battery, for the reason that it is positively and effectively held within a central or inner chamber in the electrode.

My improved battery will be readily understood upon reference to the foregoing description and the accompanying drawings, and it will be obvious to one skilled in the art that its exact detail construction and arrangement may be somewhat varied without departing from the spirit of my invention.

Having thus fully described my invention, what I claim as new, and desire to secure by Letters Patent, is—

1. In a storage battery, the combination with a body of active material; of a pair of perforated electric conductors arranged on opposite sides of said body of active material, and electrically connected thereto, and a non-electric-conducting material arranged in the perforations of the electric-conductors and consisting of quartz-sand having its separate grains or particles held together by a non-electric-conducting material substantially as and for the purpose set forth.

2. In a storage battery, the combination with a body of active material; of opposite perforated electric conducting frames having their inner faces in contact with the active material and their outer faces protected by a coating of a non-electric conducting material, and a non-electric-conducting material arranged in the perforations of the electric conductors and consisting of quartz-sand having its separate grains or particles held together by a non-electric-conducting material, substantially as and for the purpose specified.

3. In a storage battery, the combination of an electrolyte-containing cell and a pair of electrodes arranged within the cell and insulated one from the other, said electrodes being each composed of a pair of electric conductors formed with perforations therethrough, a body of active material interposed between said conductors and electrically connected thereto, and electrolyte conducting material arranged within the perforations in the electric conductors for supporting the active material and conducting the electrolyte thereto, substantially as and for the purpose set forth.

4. In a storage battery, the combination of a body of active material, opposite conducting frames arranged on opposite sides of the active material in contact therewith and provided with perforations therethrough having their inner extremities of greater area than their outer extremities, and non-electric-conducting material filled within said perforations substantially as and for the purpose specified.

5. In a storage battery, the combination with a body of active material; of a pair of perforated electric conductors arranged on opposite sides of said body of active material and electrically connected thereto, one of said electric conductors being formed with a shoulder for engaging the edge of said body of active material and supporting the same in position, and electrolyte-conducting material arranged within the perforations in the electric conductors for supporting the active material and conducting the electrolyte thereto substantially as and for the purpose set forth.

6. In a storage battery, the combination of an electrolyte-containing cell and a pair of electrodes arranged within the cell and insulated one from the other, said electrodes being each composed of a pair of electric conductors formed with perforations therethrough, a body of active material interposed between said conductors and electrically connected thereto, and quartz-sand filled within said perforations in the electric conductors for supporting the active material and conducting the electrolyte thereto, said sand having its grains or particles held together by non-electric conducting adhesive material, substantially as and for the purpose specified.

7. The herein described electrode for storage batteries, the same comprising a core of active material, and a perforated electric conductor incasing the core of active material and having its inner face electrically connected to said core, and non-electric conducting porous material filled within the perforations of said electric conductor, substantially as and for the purpose specified.

8. The herein described electrode for storage batteries, the same comprising a core of active material, and a perforated electric conductor incasing the core of active material and having its inner face electrically connected to said core, and non-electric-conducting porous material filled within the perforations of said electric conductor, and consisting of quartz-sand having its separate grains or particles held together by a non-electric-conducting material, substantially as and for the purpose specified.

9. The herein described electrode, for storage batteries, the same comprising a core of active material, and opposite walls composed of quartz-sand and elastic non-electric conducting material for holding together the grains of quartz-sand, substantially as and for the purpose specified.

In testimony whereof I have hereunto signed my name, in the presence of two attesting witnesses, at Syracuse, in the county of Onondaga, in the State of New York, this 16th day of January, 1893.

HENRY K. HESS.

Witnesses:
CLARK A. NORTON,
E. A. WEISBURG.